(12) United States Patent
Crall

(10) Patent No.: US 8,360,395 B2
(45) Date of Patent: Jan. 29, 2013

(54) SLIDING VALVE ASSEMBLY

(75) Inventor: Craig W. Crall, Los Gatos, CA (US)

(73) Assignee: Dragon America Motor Technologies, Inc., Mountainview, CA (US)

( * ) Notice: Subject to any disclaimer, the term of this patent is extended or adjusted under 35 U.S.C. 154(b) by 1045 days.

(21) Appl. No.: 12/291,219

(22) Filed: Nov. 7, 2008

(65) Prior Publication Data
US 2010/0116239 A1 May 13, 2010

(51) Int. Cl.
*F16K 25/00* (2006.01)
*F02B 75/04* (2006.01)
*F01L 5/00* (2006.01)

(52) U.S. Cl. ...... 251/204; 251/175; 251/172; 123/74 D; 123/188.4

(58) Field of Classification Search .......... 251/193–204, 251/172, 174, 175, 176; 123/74 D, 188.4, 123/188.6
See application file for complete search history.

(56) References Cited

U.S. PATENT DOCUMENTS

| | | | |
|---|---|---|---|
| 1,103,901 A | 7/1914 | Fischer | |
| 1,222,615 A | 4/1917 | Fischer | |
| 1,618,687 A | 2/1927 | Swanstrom | |
| 1,722,873 A | 7/1929 | Welch | |
| 1,922,678 A | 8/1933 | Hallett | |
| 2,074,487 A * | 3/1937 | Porter | 123/188.1 |
| 2,409,350 A | 10/1946 | Forrest | |
| 2,653,789 A * | 9/1953 | Eichenberg | 137/246.12 |
| 2,950,897 A * | 8/1960 | Bryant | 251/172 |
| 3,457,957 A | 7/1969 | Mueller | |
| 3,463,447 A * | 8/1969 | Ripert | 251/158 |
| 3,635,436 A * | 1/1972 | Tillman | 251/31 |
| 4,098,238 A | 7/1978 | Vallejos | |
| 4,136,710 A * | 1/1979 | Bond | 137/375 |
| 4,201,174 A | 5/1980 | Vallejos | |
| 5,542,645 A * | 8/1996 | Beson | 251/172 |
| 5,596,966 A | 1/1997 | Elder | |
| 5,694,890 A | 12/1997 | Yazdi | |
| 6,105,542 A | 8/2000 | Efford | |
| 6,328,012 B1 | 12/2001 | Clements | |
| 6,979,464 B2 | 12/2005 | Gutowska | |
| 2004/0237926 A1 | 12/2004 | Crall | |
| 2007/0289562 A1 | 12/2007 | Zajac et al. | |

* cited by examiner

*Primary Examiner* — Len Tran
*Assistant Examiner* — Justin Jonaitis
(74) *Attorney, Agent, or Firm* — Clifford A. Poff; Paul Bogdon

(57) ABSTRACT

A sliding valve assembly includes a valve body having a fluid conducting port adjacent to a fluid impervious surface. The actuator allows fluid to travel through the valve assembly and into a fluid blocking position where the fluid impervious surface obstructs the fluid from traveling through the valve assembly. First and second sealing assemblies include a primary seal ring, a secondary seal ring around the primary seal ring, and a spring forcing the primary seal ring against a sealing surface. As pressure in the system increases, this pressure is delivered to the sealing assemblies to force them against the sealing surfaces to enhance the sealing relationship. Cams and cam followers affixed to the valve body overcome the frictional forces of the sealing system and the valve body and valve housing to increase the efficiency of the valve assembly and the system in which the valve assembly is used.

31 Claims, 10 Drawing Sheets

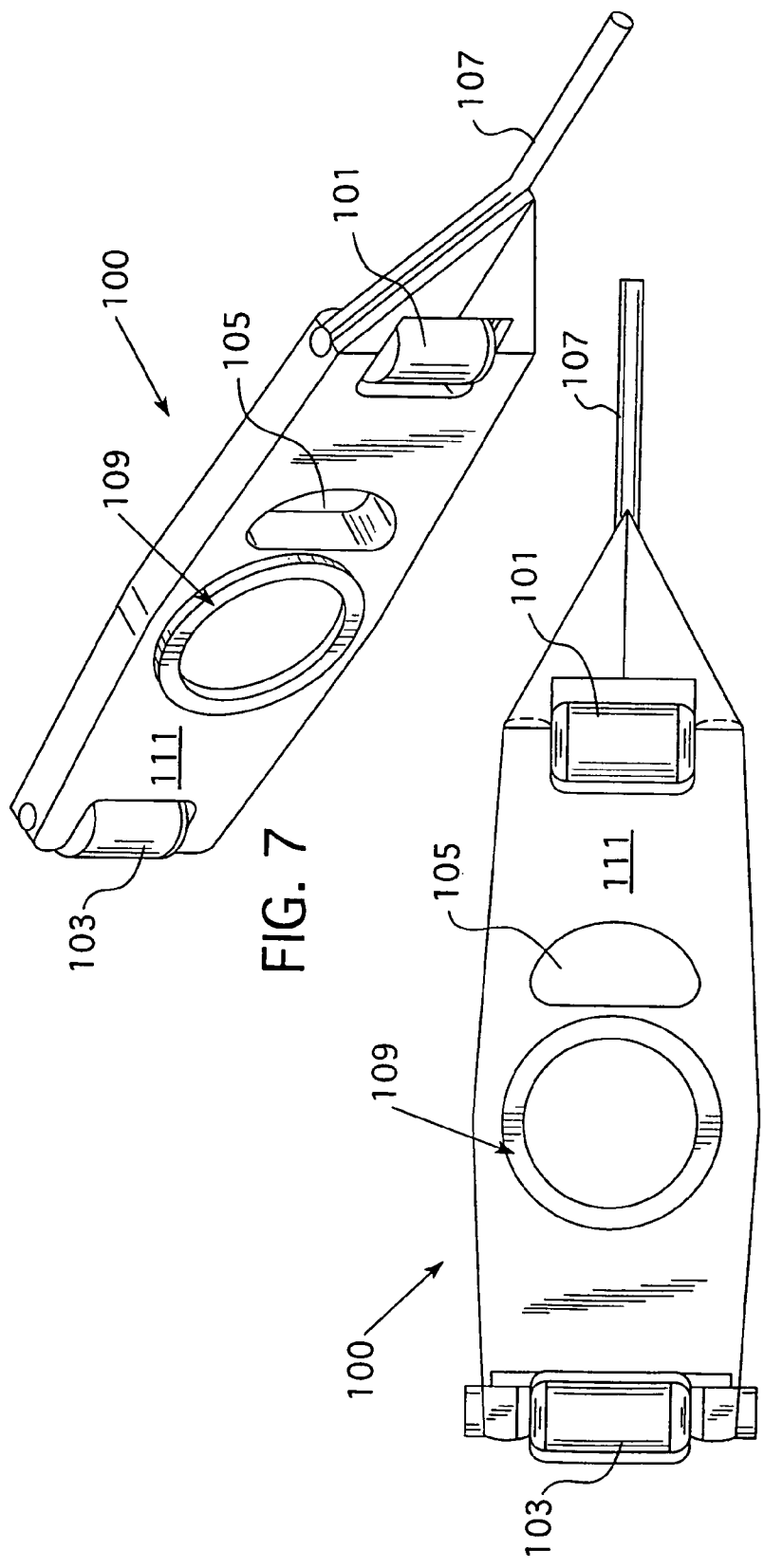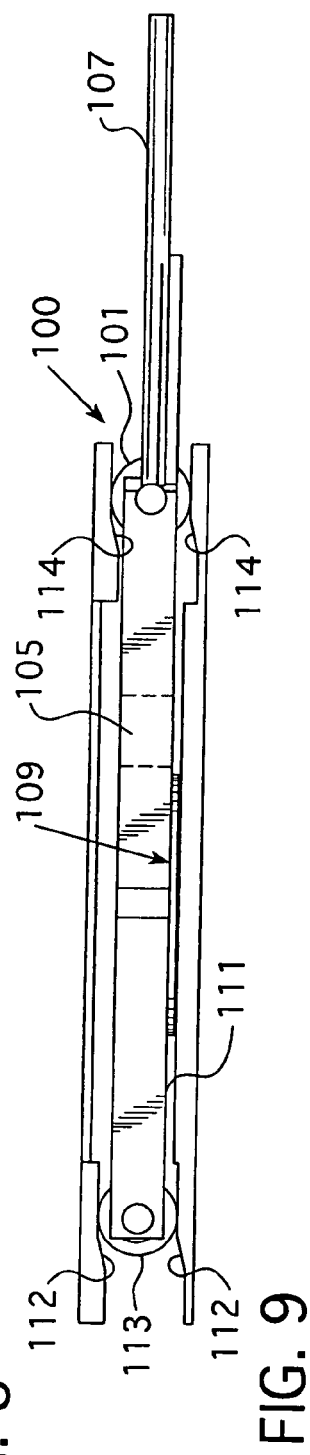

SLIDING VALVE ASSEMBLY

BACKGROUND OF THE INVENTION

1. Field of the Invention

The present invention relates to a valve assembly suitable for use in a pressure system involving a pressure actuator, for example, an energy conversion engine, e.g. an internal combustion engine or a heat engine, e.g. a diesel engine, a Sterling cycle engine, a Miller cycle engine, and an Otto cycle engine. More particularly, the present invention relates to a sliding valve assembly for use in a pressure system and having an improved sealing system configured to reduce friction, heat and wear on the valve and body related sealing components.

2. Description of the Prior Art

Most modern internal combustion engines utilize a four stroke operating sequence known as the Otto cycle. The Otto cycle comprises an intake stroke, in which an intake valve opens and a mixture of air and fuel is directed into the cylinder of the engine. A compression stroke then occurs in which the piston compresses the mixture of fuel and air to increase the pressure in the cylinder. A spark provided by a spark plug ignites the mixture just before the piston reaches the top of the cylinder, causing the piston to be forced down in the cylinder in the power stroke. An exhaust valve then opens in the exhaust stroke, in which burned gases are forced out of the cylinder. The four strokes are repeated continuously during operation of the engine.

Internal combustion engines operating on the Otto cycle principal generally utilize spring-loaded poppet valves that selectively open and close the intake and exhaust ports during each cycle. In most engines, a crankshaft is coupled to a timing belt or chain, which in turn is coupled to a camshaft that rotates to open the intake and exhaust valves during the intake and exhaust strokes, respectively. A spring associated with each valve closes the valve during the other cycles.

There are several drawbacks associated with the use of such spring-loaded poppet valves. One drawback is that the valves protrude into the cylinder during each cycle, and there is an inherent risk that the piston may contact an open valve at a high force and cause substantial engine damage. Additionally, valve timing events may be limited due to the protrusion of the valve head into the cylinder.

Another disadvantage with the use of poppet valves in conventional internal combustion engines is that a relatively stiff spring is used to close the valves. Therefore, a relatively strong force is required to overcome the resistive force of the spring to open each valve during each cycle, reducing the efficiency of the engine. Moreover, due to the stiff resistive force provided by the springs, valve timing events may be limited. For example, there generally is a short time period during which both the intake valve and the exhaust valve are open when conventional poppet valves and stiff springs are employed. During this overlap period, unburned hydrocarbon molecules may remain in the combustion chamber for a subsequent cycle, thereby adversely affecting dynamic compression and reducing engine efficiency.

Yet a further disadvantage associated with the use of conventional poppet valves is that energy is lost as a result of an obstruction of the orifice, i.e., because a portion of a poppet valve protrudes through the orifice and into the cylinder. Moreover, flow into the cylinder through the intake port is disrupted when it contacts the head of the poppet valve, i.e., the portion of the valve that seals the orifice in the closed state. The intake valve head may cause turbulence and dead air space within the cylinder, which in turn reduces the efficiency of the engine. Furthermore, when the head of the exhaust valve protrudes into the cylinder during the exhaust stroke, burned gases may not efficiently flow out of the cylinder, which further reduces combustion capabilities.

Various sliding valve designs, which may be used in conjunction with internal combustion engines, have been developed to overcome several of the drawbacks associated with conventional poppet valves. One primary advantage of a sliding valve assembly is the capability to have a substantially unobstructed flow path. Specifically, because a conventional poppet valve is not employed, and therefore does not obstruct the flow path through an intake or exhaust port, a sliding valve has the potential to significantly increase airflow capability into a cylinder. Moreover, since the stiff springs used in conjunction with conventional poppet valves may be omitted, sliding valve assemblies may achieve reduced mechanical loads.

Some sliding valve assemblies have rotating discs, cylinders, sleeves and other spheroidal rotating mechanisms. Such previously known sliding valves may be timed such that their apertures overlap with the cylinder during the intake and exhaust strokes. However, due to their continuous seal contact, these known sliding valves may experience high temperatures and extreme friction, resulting in high rates of wear imposed on the valve and any related sealing mechanisms.

Moreover, such sliding valve assemblies generally have fixed aperture sizes, i.e., the size of the aperture in registration with the cylinder may not be varied as the valve is translated or displaced i.e. moved back and forth in a plane as opposed to rotation. Accordingly, the fuel consumption and emissions may be increased by providing a relatively large port aperture, resulting in low gas velocities, which adversely affect engine performance at low engine speeds, particularly during idling conditions.

Examples of sliding valve assemblies are disclosed in U.S. Pat. Nos. 1,722,873; 1,922,678; 2,074,487; and 5,694,890.

Another drawback associated with some of the sliding valve systems of the prior art is the complexity of the sealing system employing a significant number of seals. It would be desirable to provide an effective sealing system for a sliding valve system that employs significantly fewer components.

There is a need therefore to provide a sliding valve assembly that is configured to be easily incorporated into a pressure system, for example, energy conversion engines, e.g. internal combustion engines.

There is a still further need to provide a sliding valve assembly that is configured to reduce friction, heat and wear on the valve body and related sealing components.

There is yet a further need to provide a sliding valve assembly having an improved sealing system configured to effectively seal the valve and/or the combustion chambers of the piston cylinder assemblies associated with energy conversion engines or having an improved sealing system configured to effectively seal the valve and/or the pressure chambers associated with pressure systems.

SUMMARY OF THE INVENTION

The present invention has met these needs. The present invention provides a sliding valve assembly for introducing and/or exhausting a fluid medium relative to a combustion chamber or cylinder containing a reciprocating piston for an energy conversion engine, for example, an internal combustion engine. The sliding valve assembly includes: a valve housing having a first fluid conducting passage and a second fluid conducting passage separated by a valve cavity; a valve body contained in the valve cavity of the valve housing and having a fluid conducting port adjacent to a fluid impervious surface; an actuator for translating movements of the valve body within the valve cavity of the valve housing into a fluid conducting position wherein the fluid conducting port of the valve body allows a fluid conducting relationship between the first fluid conducting passage and the second fluid conducting passage of the valve housing and into a fluid blocking position where the fluid impervious surface of the valve body obstructs a fluid conducting relation between the first fluid conducting passage and the second fluid conducting passage of the valve housing; cooperating surfaces on the valve body and the valve housing for constraining the valve body during the translating movements of the valve body within the valve cavity of the valve housing between the fluid conducting position and the fluid blocking position of the valve body; and a sealing system including a first sealing assembly located within the fluid impervious surface of the valve body for forming a sealing relationship between the valve body and the valve housing, said first sealing assembly in communication with the pressure in the system and adapted to receive the pressure in the system thereby increasing the effectiveness of the first sealing assembly. The sealing system also includes a second sealing assembly located within the valve housing for forming a second sealing relationship between the valve housing and the valve body.

The first sealing assembly and the second sealing assembly include a primary seal ring, a secondary seal ring surrounding the periphery of the primary seal ring, and a resilient member, e.g. tension spring arranged to apply a resilient force between the primary seal ring and its respective sealing surface for loading the primary seal ring against its respective sealing surface. With regard to the first sealing assembly, the sealing surface may include a wall of the seal cavity of the valve body; whereas with regard to the second sealing assembly, the sealing surface may include a wall of the seal cavity of the valve housing.

The first sealing assembly and the second sealing assembly and its primary seal ring may have one of many shapes, e.g. cylindrical or non-cylindrical, for example, obloid and D-shape, and the secondary seal ring is freely moveable relative to the primary seal ring within its respective seal cavity.

The valve housing also includes a cap mounted within an annular member of the upper valve housing. This cap may include a plurality of parallel ports or channels, each forming a passage for the fluid medium and/or pressure in the system for delivering pressure to at least the second sealing assembly located within the valve housing for increasing its sealing effectiveness against the sealing surface of the valve housing. This arrangement of the ports or channels for directing high pressure in a combustion chamber of a cylinder to the sealing assembly acts to enhance the sealing effect of this second sealing assembly. Absent these ports, the pressure within the system travels within the seal cavity containing the first and/or second sealing assembly to force or pressure the primary seal ring and the secondary seal ring of the first and/or second sealing assembly against one or more sealing surfaces of the seal cavity containing the first and/or second sealing assembly to force or further pressure the primary seal ring and the secondary seal ring of the first and/or second sealing assembly against one or more sealing surfaces of the valve body or the valve housing.

The cooperating surfaces may include one or more cams and cam followers responsive to the valve body actuator. These cooperating surfaces of the cams and cam followers may act to constrain the valve body during its translating movements within the valve housing for opening and closing the valve assembly. The cams may include surfaces located in housings on either side of the valve body or in the valve body itself, with the followers attached to the lateral sides of the valve body for engagement with the cam surfaces. The cam surfaces may be straight or they may have an inclined portion. If the cam surfaces have an inclined portion, the followers will be raised thereby raising the valve body away from the valve housing during the translational movement of the valve body thereby effectively separating the valve body from the valve housing and thus moving at least the first sealing assembly away from the lower portion of the valve housing.

A further embodiment includes a front cam follower and a rear cam follower mounted along the width of the valve body wherein these cam followers cooperate with cam surfaces of the valve housing for reducing the friction between the contact and/or sealing surfaces of the sealing system of the sliding valve assembly.

Advantageously, because the valve body is forced away from the sealing surface of the valve housing by the linear cam and cam followers during the translational movement or oscillations of the valve body relative to the valve housing by the actuator, the friction, heat and wear on the valve, the valve body and related sealing components may be substantially reduced compared to conventional sliding valves.

The valve body is disposed substantially within the valve cavity or bore of the valve housing. The valve body is configured to translate or oscillate within the valve housing via a cam and actuator system according to the timing of the rotation of the camshaft and crankshaft, thereby selectively enabling or preventing fluid communication between the passageway of the valve body and a cylinder of an internal combustion engine. Specifically, translational movement of the valve body in a first direction enables fluid communication, while translational movement of the valve body in an opposing direction prevents fluid communication with the cylinder. In this latter or closed position of the valve assembly, the pressure in the system, e.g. cylinder pressure and the resilient member, e.g. spring of the sealing assembly or sealing assemblies provide an effective seal for the pressure system.

Any number of types of actuators may be used for the translational movement of the valve body. For example, camshafts, solenoids, rocker arms, chains, gears, belts, and hydraulic, pneumatic, electric actuators, and/or other means may be employed to cause translational movement of the valve body. Thus, the present invention further allows considerable flexibility with respect to the different types of actuators that may be employed, particularly compared to prior art sliding valve assemblies that rely solely on conventional mechanisms to provide the translational movement of the valve. Such design flexibility provides various advantages in addition to the translational movement of the valve body, for example, the attainment of variable aperture sizes and timing events, as generally described herein below.

If used in a conventional internal combustion engine, a first sliding valve assembly of the present invention would be employed as an intake valve, and a second sliding valve assembly of the invention would be employed as an exhaust valve.

The valve assembly of the invention may also be used effectively in any number of pressure systems. The valve assembly may be any one of a number of valve assemblies, for example, a sliding valve assembly, a rotating valve assembly, a semi-rotating valve assembly, or an oscillating valve assembly.

It is therefore, an object of the present invention to provide a valve assembly with an improved sealing system for use in a pressure system, such as an energy conversion engine or heat engine, for example, in internal combustion engines.

It is a further object of the present invention to provide a valve assembly such as a sliding valve assembly having an improved sealing system that is configured to reduce friction, heat and wear on the valve and body related sealing components.

It is still a further object of the present invention to provide a valve assembly such as a sliding valve assembly having an improved sealing system such that as the system pressure increases, the pressure causes the seal to be compressed against a sealing surface thereby increasing the effectiveness of the sealing system.

It is yet a further object of the present invention to provide a valve assembly such as a sliding valve assembly that may be actuated using any number of means thereby affording more design flexibility.

These and other advantages and objects of the present invention will be better appreciated and understood when read in light of the accompanying drawings.

BRIEF DESCRIPTION OF THE DRAWINGS

FIG. 7 is a perspective view of a further embodiment of a sliding valve assembly according to the teachings of the present invention.

FIG. 8 is a bottom elevational view of the sliding valve assembly of FIG. 7.

FIG. 9 is a side elevational view of the sliding valve assembly of FIG. 7.

DETAILED DESCRIPTION OF THE INVENTION

The valve assembly including an improved sealing system of the present invention may be a sliding valve assembly, a rotary valve assembly, a semi-rotary valve assembly or an oscillatory valve assembly for use in a pressure system which may or may not include a pressure actuator, for example, an energy conversion engine, e.g. an internal combustion engine or a heat engine, for example, a diesel engine, a Sterling cycle engine, a Miller cycle engine, and an Otto cycle engine.

Figure 1A:
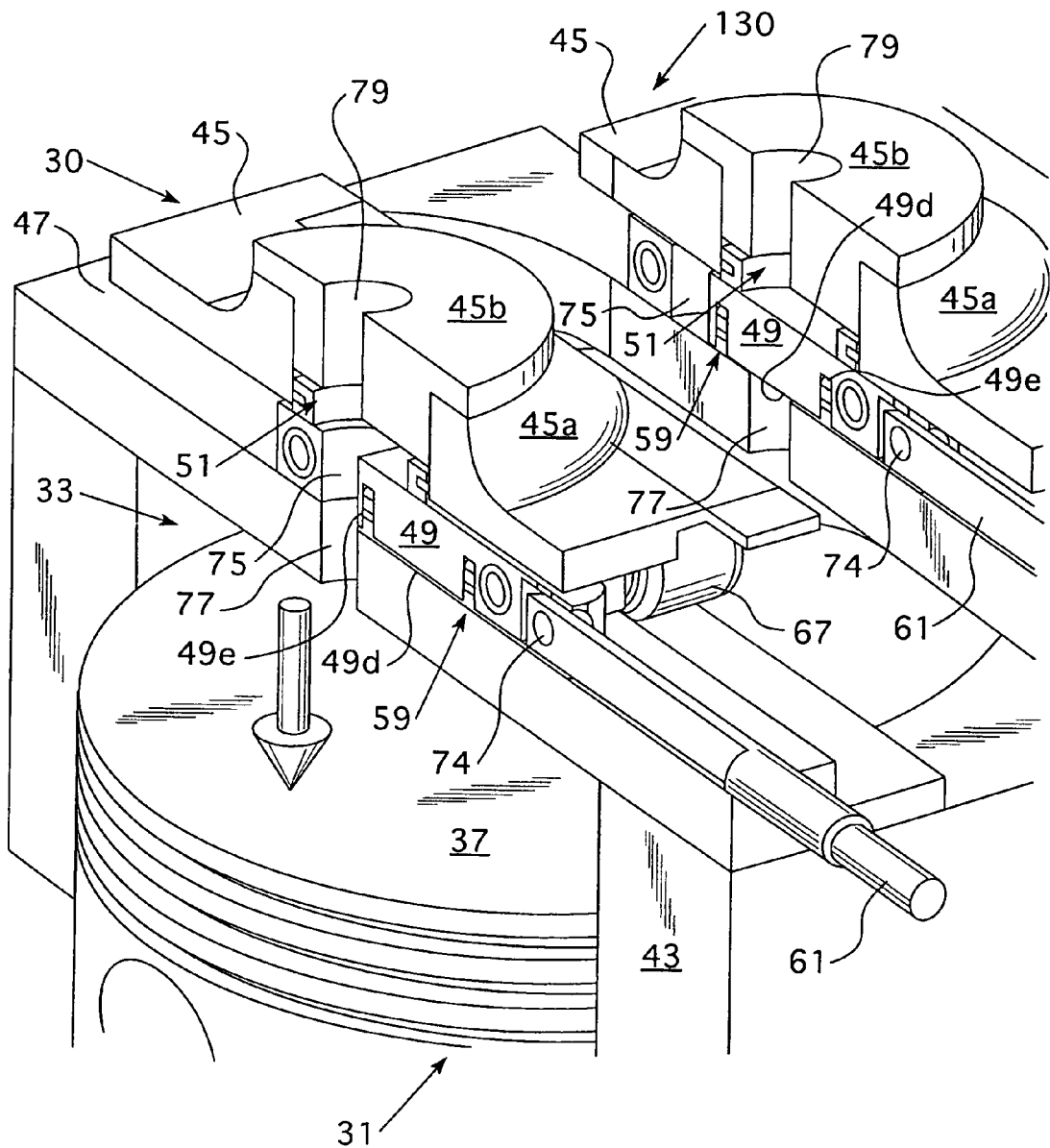
FIG. 1A is a perspective, partially cut-away view of a sliding valve assembly according to the present invention used as an intake valve and an exhaust valve during an intake stroke of a standard internal combustion engine.
Figure 1B:
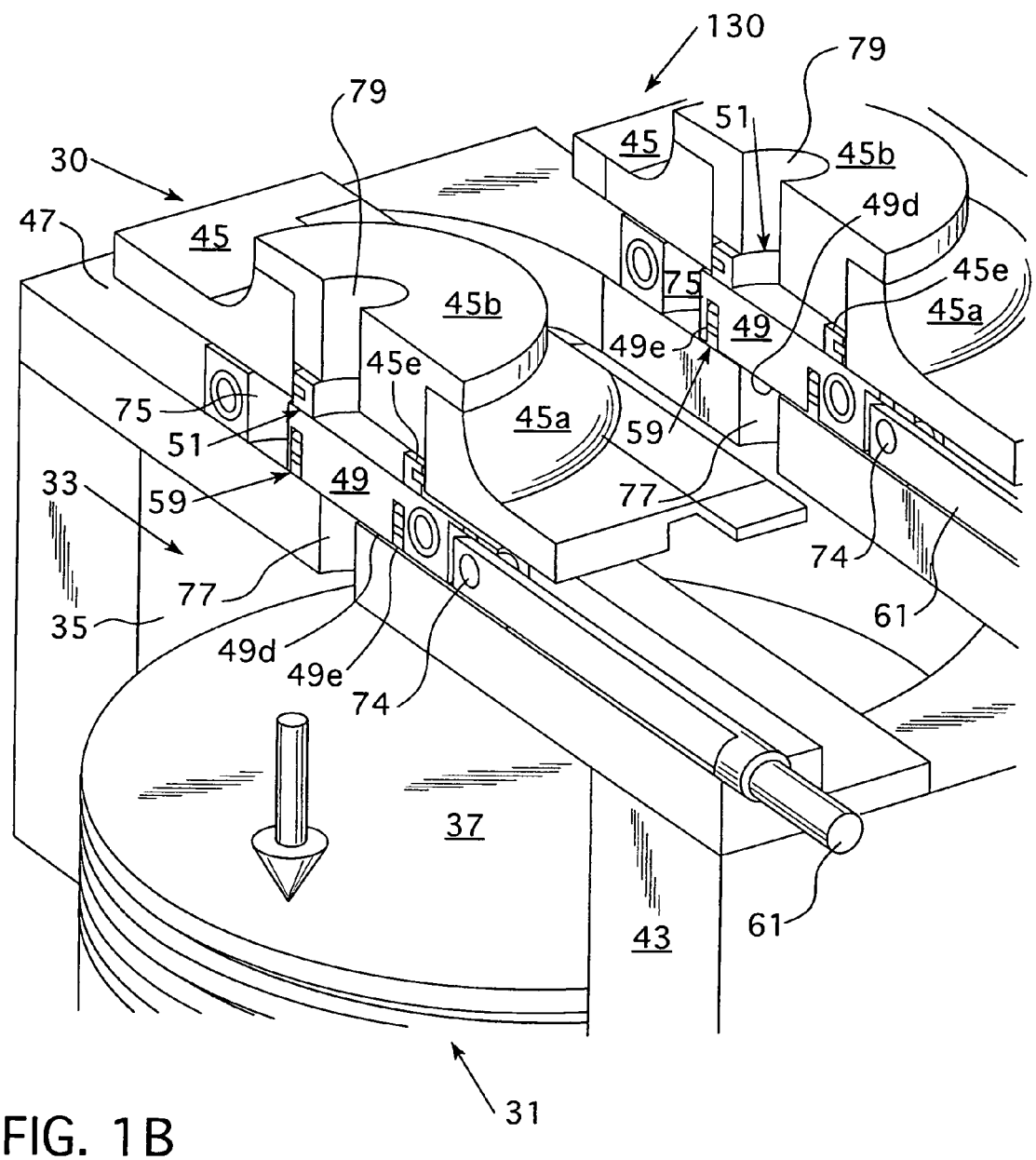
FIG. 1B is a perspective, partially cut-away view of the sliding valve assembly according to the present invention used as an intake valve and an exhaust valve during a compression or power stroke of a standard combustion engine.
Figure 1C:
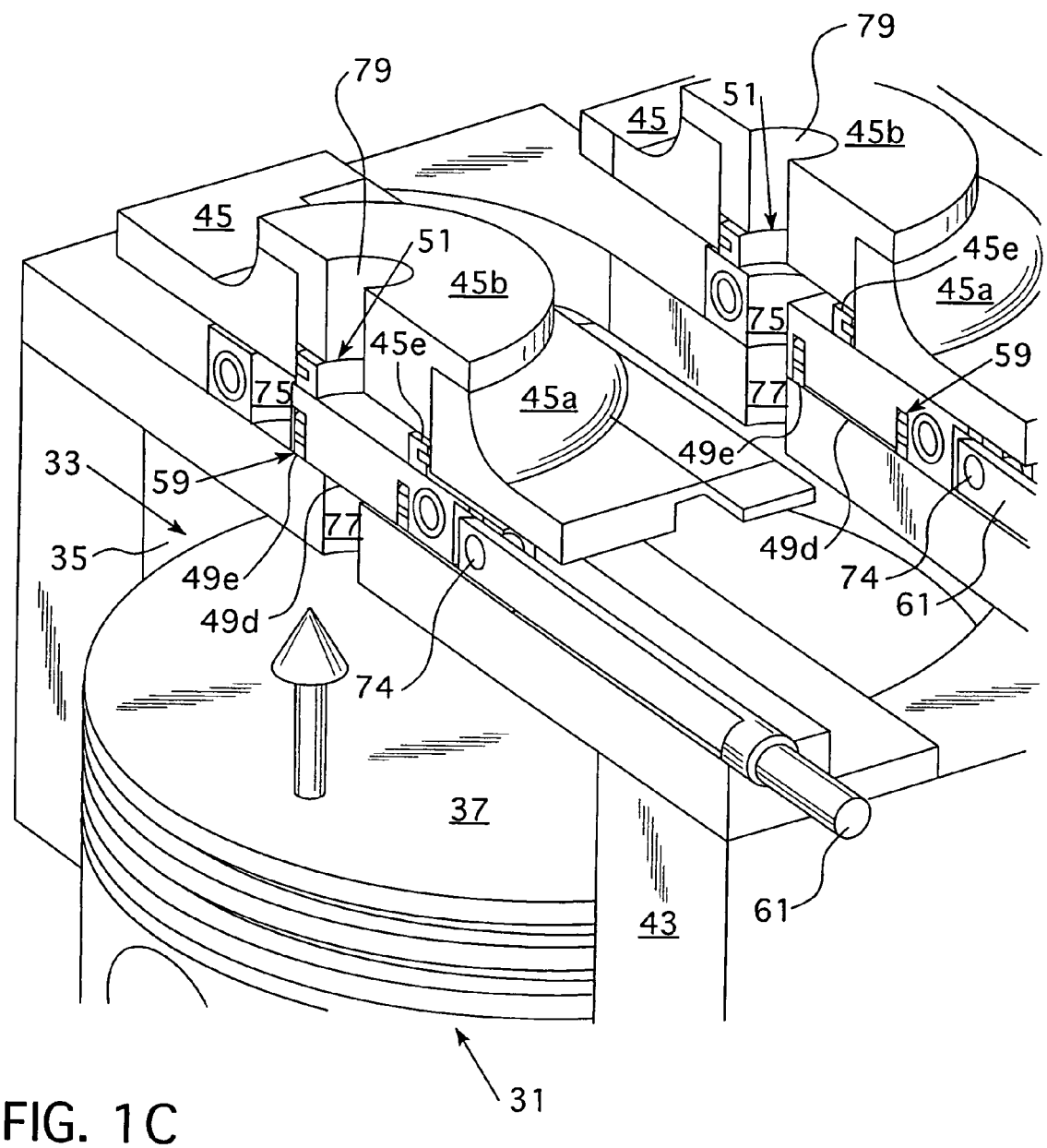
FIG. 1C is a perspective, partially cut-away view of the sliding valve assembly according to the present invention used as an intake and exhaust valve during an exhaust stroke of a standard internal combustion.

Referring to FIGS. 1A, 1B, 1C and 2, the sliding valve assembly 30, 130 of the present invention may be used as an intake valve and/or an exhaust valve in a standard internal combustion engine. In a preferred embodiment, the configurations of the intake valve and the exhaust valve are substantially identical. Accordingly, in FIGS. 1A-1C, an intake valve of the present invention will be referred to generally as an intake valve 30 while an exhaust valve will be referred to generally as an exhaust valve 130, although each valve preferably is provided in accordance with the sliding valve assembly 30 of FIG. 2. In FIGS. 1A through 1C, the intake valve 30 and the exhaust valve 130 are broken away for clarity purposes so as to more clearly see the location of the sealing system within the sliding valve assembly of the invention.

Figure 4:
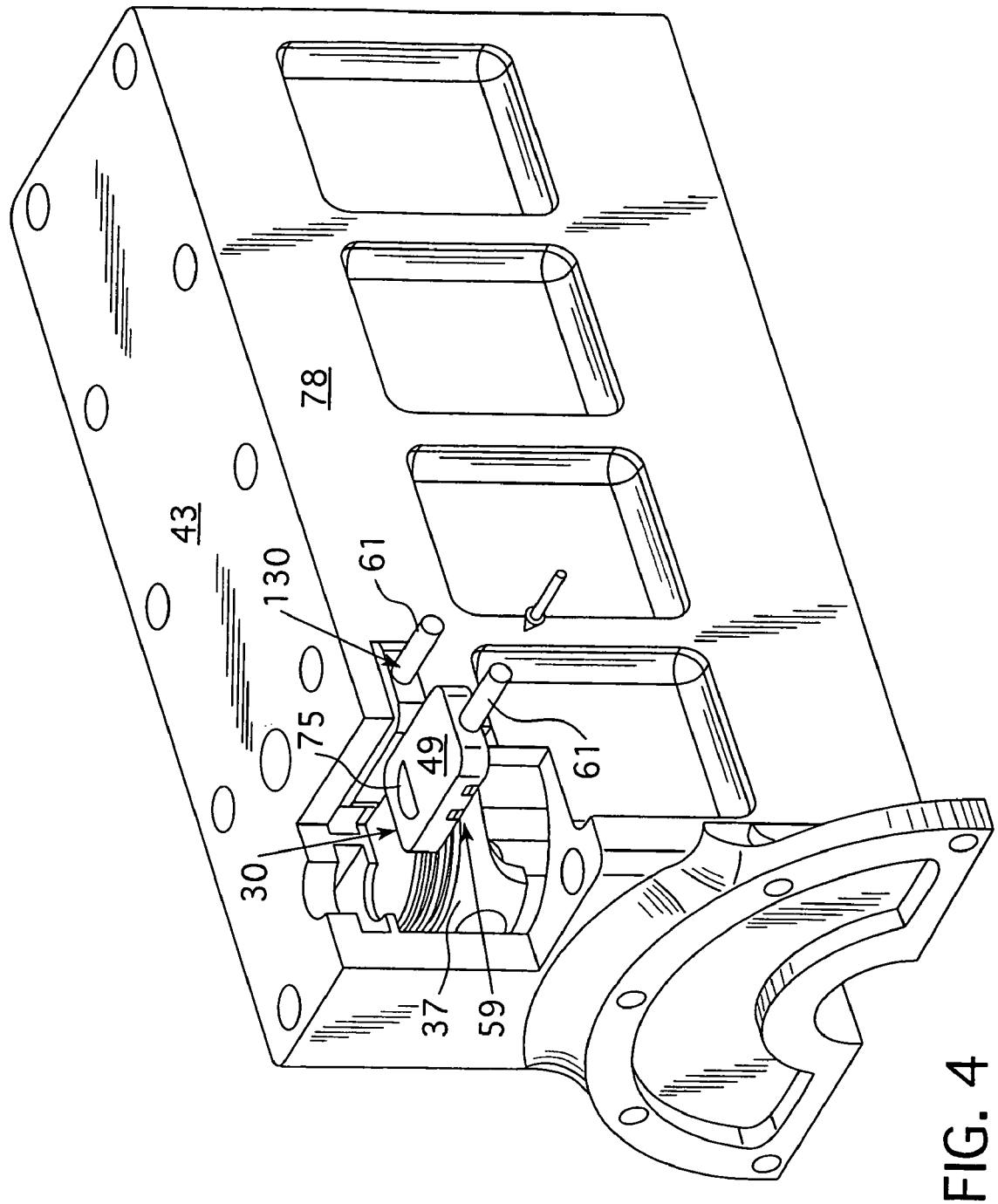
FIG. 4 is a perspective view of a standard internal combustion engine wherein a cylinder head is integrated into an engine block and incorporating the sliding valve assembly of the present invention as an intake valve and an exhaust valve.

In FIGS. 1A-1C, a standard internal combustion engine 31 comprises a cylinder 33, a combustion chamber 35 and a piston 37, which is coupled to a crankshaft via a connecting rod (not shown) in a manner known to those skilled in the art. Intake valve 30 and exhaust valve 130 may be provided as separate modular components that are disposed atop cylinder head 43 or within the head 43 or, alternatively, intake valve 30 and exhaust valve 130 may be formed as single units within cylinder head 43, as illustrated in FIG. 4. The valve assemblies 30 and 130, because of their compact nature, may be combined with the engine block 43, thus eliminating the need for a separable cylinder head. A single-piece head/block arrangement has several advantages. For example, the head bolts may be eliminated or the number of head bolts may be reduced. The engine block may be of a stronger and sturdier construction. The head gaskets and attaching hardware may be eliminated, thus allowing easy access for maintenance, i.e. service, and access, and, thus reduced manufacturing and maintenance costs.

Figure 2:
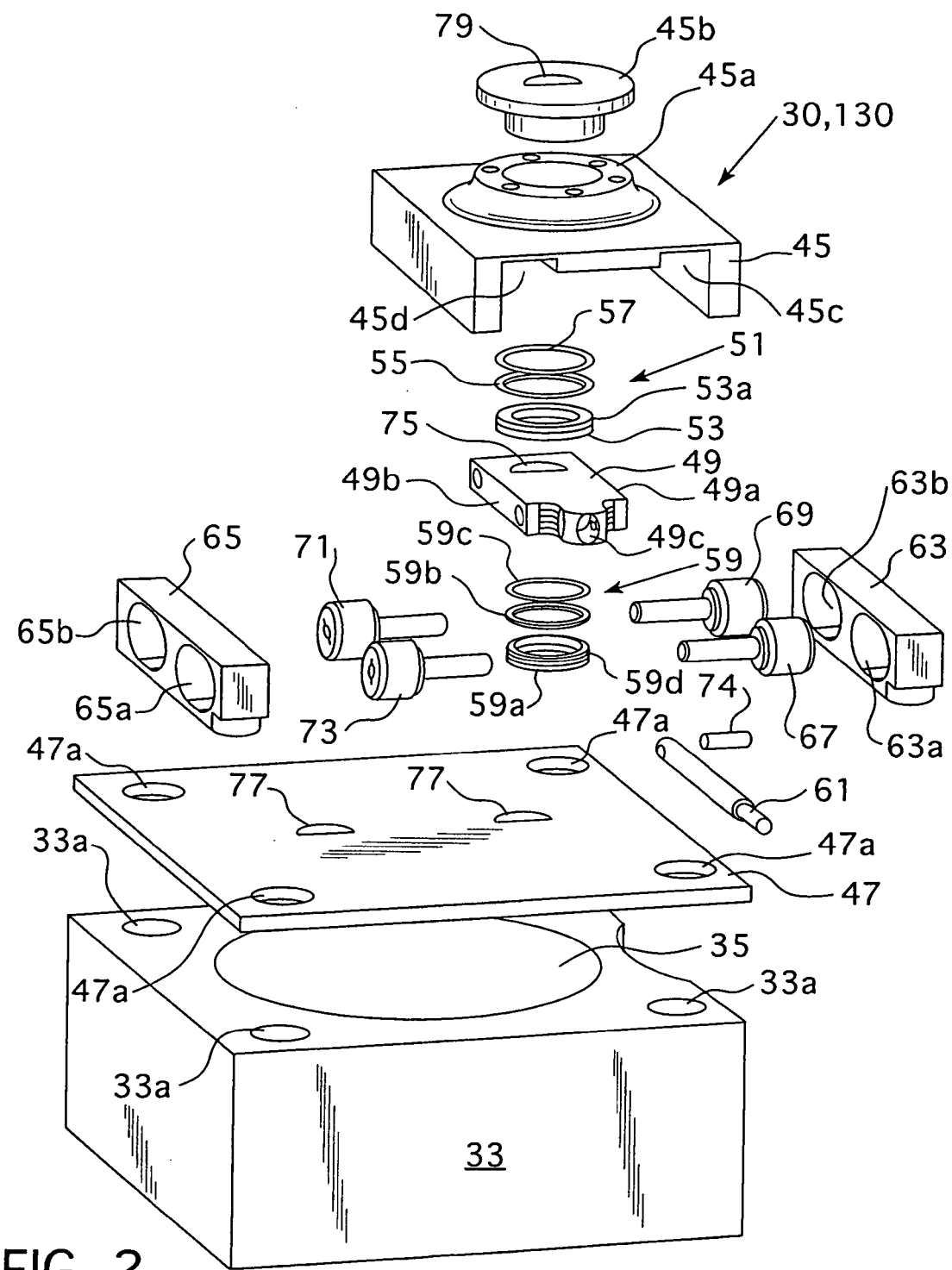
FIG. 2 is an exploded perspective view of the sliding valve assembly of the present invention.

FIG. 2 shows one sliding valve assembly of the present invention for use in an internal combustions engine wherein as stated herein above the sliding valve assembly 30, 130 may be used as an intake valve 30 and an exhaust valve 130. Therefore, two sliding valve assemblies of the invention will be provided relative to cylinder 33. Sliding valve assembly 30, 130 includes a valve housing which is comprised of an upper valve housing 45 and a lower valve housing 47; a valve body 49 which is housed in the valve housing; and a sealing system including a sealing assembly 51 which includes a primary seal ring 53, a secondary seal ring 55 and a resilient member or spring 57 and a sealing assembly 59 which includes a primary seal ring 59a, a secondary seal ring 59b, and a resilient member or spring 59c. As shown in FIG. 2, the lower valve housing 47 is a single plate extending over the combustion chamber 35 of cylinder 33. Also, as shown in FIG. 2, the upper valve housing 45 for each sliding valve assembly 30, 130 is about half the length of the lower valve housing plate 47. The upper valve housing 45 is fixedly connected to the lower valve housing plate 47 through suitable means such as welding. The lower valve housing plate 47 and the cylinder 33 are connected together by fasteners (not shown) such as screws received in apertures 47a in the lower valve housing plate 47 and apertures 33a of cylinder 33.

Still referring to FIG. 2 sliding valve assembly 30, 130 further includes a valve actuating rod 61; linear cams 63, 65 and roller bearings or cam followers 67, 69, 71 and 73 mounted to the lateral sides 49a and 49b of valve body 49.

Linear cam 63 has cooperating cam surfaces 63a and 63b which are engaged by cam followers 67, 69 respectively, and linear cam 65 has cooperating cam surfaces 65a and 65b which are engaged by cam followers 71 and 73. Cam followers 67, 69, 71 and 73 travel on cam surfaces 63a, 63b, 65a and 65b when valve body 49 is translated or oscillated within the valve housing via actuation of actuator rod 61. Actuator rod 61 is received in aperture 49c of valve body 49 wherein it is retained via retaining pin 74. It is to be appreciated that the arrangement of the valve actuating rod 61 within aperture 49c via retaining pin 74 is such that actuating rod 61 is permitted to freely move or toggle relative to valve body 49 during movement of the valve body 49 within the valve housing. This toggle feature becomes particularly important when linear cams 63 and 65 and followers 67, 69, 71 and 73 are used, and particularly if the cam surfaces 63a, 63b, 65a and 65b of cams 63, 65 are inclined.

As further shown in FIG. 2, valve body 49 has an opening or fluid conducting port 75, the upper valve housing 45 has an opening or a first fluid conducting passage 79, and the lower valve housing plate 47 has an opening or a second fluid conducting passage 77. The upper valve housing 45 has an annular member 45a which receives a cap 45b defining the first fluid conducting passage 79. The upper valve housing 45 also includes two channels 45c and 45d which receive cams 63, 65 respectively when valve body 49 is assembled within the upper valve housing 45.

As best shown in FIGS. 1A, 1B and 1C pertaining to a standard internal combustion engine, cap 45b is mounted within the annular member 45a of the upper valve housing 45 and forms a seal cavity 45e for retaining the sealing assembly 51, the latter of which is shown best in FIG. 2. As also shown in FIGS. 1A, 1B and 1C, the valve body 49 has a lower fluid impervious surface 49d that is adjacent to or juxtaposed relative to the fluid conducting port 75 of the valve body 49. The valve body 49 further includes a seal cavity 49e for retaining the sealing assembly 59, the latter of which is shown best in FIG. 2.

When the lower valve housing plate 47, the upper valve housing 45 and the valve body 49 are assembled as shown in FIGS. 1A, 1B and 1C, the fluid conducting port 75 of the valve body 49, the first fluid conducting passage 79 of upper valve housing 45 and the second fluid conducting passage 77 of the lower valve housing plate 47 cooperate to open the sliding valve assembly 30 when the fluid conducting port 75 of the valve body 49 is aligned with the passages 79 and 77. This alignment of port 75 with passages 77 and 79 of the sliding valve assembly 30 is referred to as being the fluid conducting position or the opened position of the sliding valve assembly 30.

Conversely, when the fluid conducting port 75 of the valve body 49 is not in alignment with the first conducting passage 79 and the second conducting passage 77, respectively of the upper valve housing 45 and the lower valve housing plate 47, the sliding valve assembly 30 is in a blocked or closed position. This blocked or closed position of the sliding valve assembly 30 is referred to herein as being the fluid blocking position or the closed position of the sliding valve assembly 30. Additionally, when the upper valve housing 45, the lower valve housing plate 47 and the valve body 49 are assembled as shown in FIGS. 1A, 1B, and 1C, the sealing assembly 51 is received in a recessed portion or seal cavity 45e of the upper valve housing 45 and the sealing assembly 59 is received in a recessed portion or seal cavity 49e in the lower fluid impervious surface 49d of the valve body 49, as discussed herein above.

Figure 3:
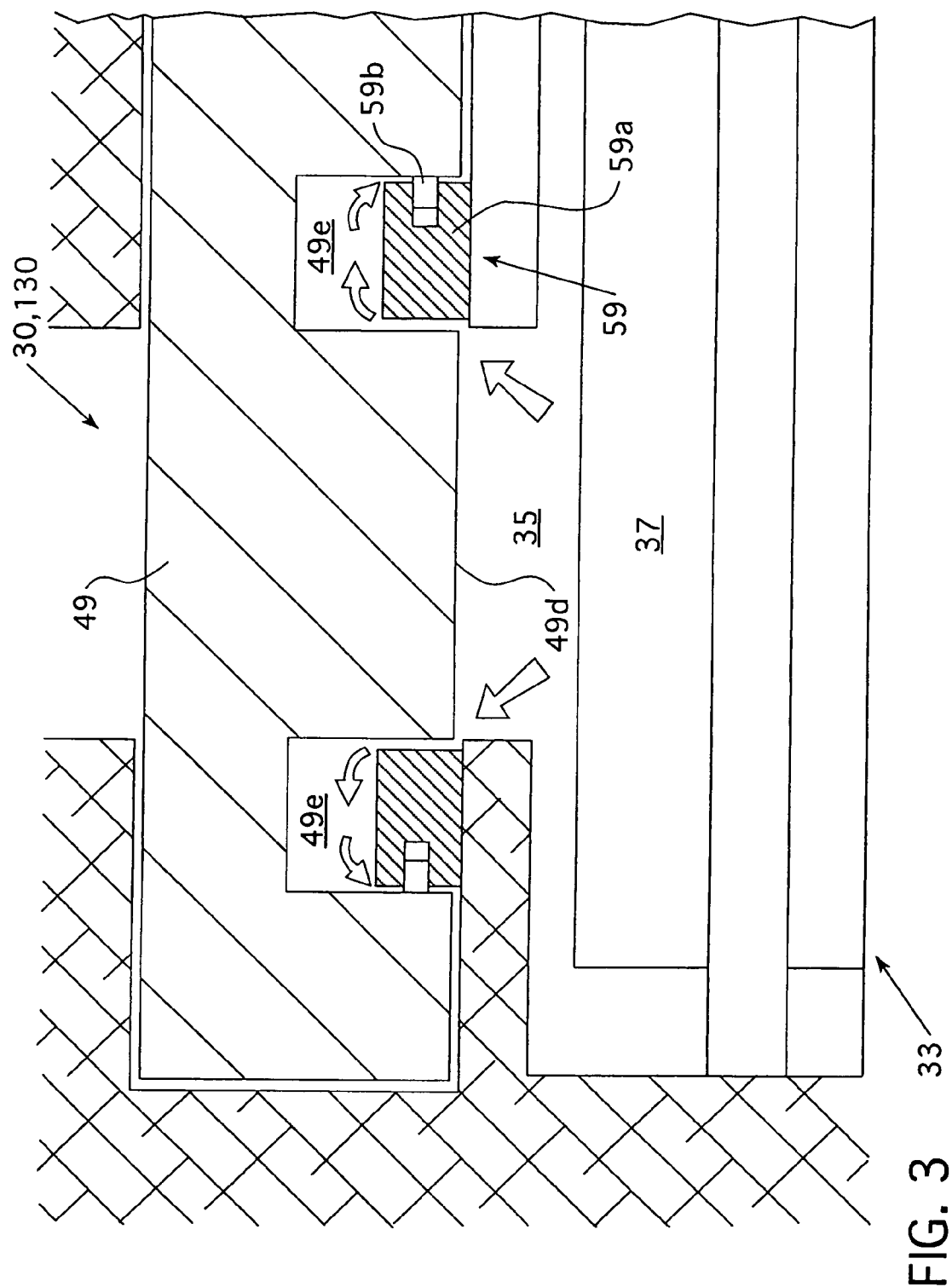
FIG. 3 is a schematic, cross-sectional, enlarged view illustrating the path of pressurized gas as it enters a seal cavity containing a sealing assembly in a valve body of the sliding valve assembly of the present invention relative to a compression cylinder.

For the standard internal combustion engine of FIG. 1A, the intake valve 30 is illustrated as being in a fluid conducting position or in its intake stroke position wherein the intake valve 30 opens and a mixture of air and fuel is directed into cylinder 33 to force the piston 37 downwardly as indicated by the arrow. For this intake stroke of sliding valve assembly 30, the exhaust valve 130 is in its fluid blocking position or closed position wherein the valve body 49 totally blocks the fluid conducting passage 79 of the upper valve housing 45 and the fluid conducting passage 77 of the lower valve housing plate 47. In this instance and with respect to both the intake valve 30 and the exhaust valve 130, the sealing assembly 59 in the seal cavity 49e of the valve body 49 becomes the primary seal and the sealing assembly 51 in the upper valve housing 45 becomes the secondary seal, which is commonly referred to as an "apron seal". Also in this instance as shown in FIG. 3, as the pressure in the combustion chamber 35 increases, the pressurized air or gas is caused to flow into the seal cavity 49e of the valve body 49 as shown by the arrows and to act against sealing assembly 59, particularly against the second sealing ring 59b to force the sealing assembly 59 against a wall surface of the seal cavity 49e to increase the effectiveness of the sealing assembly 59 for both valve sliding assemblies 30 and 130. As is also apparent, the mixture of air and fuel is directed into the combustion chamber 35 upon the intake stroke of the sliding valve assembly 30 and is prevented from seeping out of the exhaust valve assembly 130 in view of its respective sealing assemblies 51 and 59 and particularly due to the added performance of the sealing assembly 59 within valve body 49 and the pressure acting upon the sealing assembly 59 as illustrated in FIG. 3.

It is to be further appreciated that with reference to FIG. 3, the sealing assembly 59 is constructed similarly to that disclosed herein above with reference to FIGS. 1A through 2. That is, the sealing assembly 59 of FIG. 3 includes a primary seal ring 59a, a secondary seal ring 59b positioned around the periphery of the primary seal ring 59a, and a resilient member 59c. In FIG. 3, the resilient member 59c is not shown for clarity purposes so as to more clearly indicate the path the pressure travels from chamber 35.

FIG. 1B shows a compression stroke or power stroke for a standard internal combustion engine 31. As illustrated, the intake valve 30 and the exhaust valve 130 are both closed. In this compression stroke, piston 37 compresses the air and fuel to increase the pressure in cylinder 33. A spark ignites the mixture before piston 37 reaches the top of cylinder 33 causing the piston 37 to be forced downwardly in the cylinder 33 in its power stroke as indicated by the arrow. Here again, sealing assembly 59 of each sliding valve assembly 30 and 130 acts as a primary seal and sealing assembly 51 in the upper valve housing 45 acts as a secondary seal or "apron seal". Here again, the pressure in the cylinder 33 travels into the seal cavity 49e as shown in FIG. 3 to force the sealing assembly 59 against a wall of the seal cavity 49e for enhancing the performance of the sealing assembly 59 for both sliding valve assemblies 30 and 130.

FIG. 1C shows an exhaust stroke for a standard internal combustion engine 31. As illustrated, the intake valve 30 is closed while the exhaust valve 130 is opened. In this exhaust stroke of piston 37, the burned gases are forced through the exhaust valve 130 and out of cylinder 33. In this opened position for exhaust valve 130 the fluid conducting port 75 is aligned with the first fluid conducting passage 79 of the upper valve housing 45 and with the second fluid conducting passage 77 of lower valve housing plate 47. Here again, the pressure in cylinder 33 travels into the seal cavity 49e of valve body 49 as shown in FIG. 3 to enhance the performance of the sealing assembly 59 of both the intake valve 30 and the exhaust valve 130. For the exhaust valve 130, the enhanced performance of sealing assembly 59 aids in directing the burned gases out through the first fluid conducting passage 79 of upper valve housing 45.

Still referring to FIGS. 1A, 1B and 1C when the sealing assembly 51 is assembled, the secondary seal ring 55 is positioned around the periphery of the primary seal ring 53 which has an external groove (shown in FIG. 2 at reference numeral 53a) for receiving the secondary seal ring 55. As discussed herein above, the sealing assembly 51 is housed in the recessed groove or seal cavity 45e of upper valve housing 45. There is preferably a sufficient clearance provided in the seal cavity 45e to allow at least the secondary seal ring 55 to move freely within the seal cavity 45e. The resilient member 57 in the form of a hoop spring is arranged in the seal cavity 45e to apply a resilient force between the primary seal ring 53 and the wall of the seal cavity 45e to load the primary seal ring 53 against the wall of the seal cavity 45e in the upper valve housing 45. Even though the resilient member 57 of the spring assembly 51 is shown as having a cylindrical shape it is to be appreciated that the resilient member 57 may have other shapes, for example, a non-cylindrical shape, for example, an obloid shape, a D-shape, or variations of a circle shape. It is also to be appreciated that the primary seal ring 53 and the secondary seal ring 55 preferably are split rings and that they may have a shape corresponding to the resilient member 57. It is also to be appreciated that the primary seal ring 53, the secondary seal ring 55 and the resilient member 57 of the sealing assembly 51 may have other shapes, for example, a non-cylindrical shape, for example, an obloid shape, a D-shape, or variations of a circle shape.

Still referring to FIGS. 1A, 1B and 1C in assembling the sealing assembly 59, the secondary seal ring 59b is positioned around the periphery of the primary seal ring 59a which has an external groove (shown in FIG. 2 at reference numeral 59d) for receiving the secondary seal ring 59b. The sealing assembly 59 is housed in the recessed groove or seal cavity 49e of the valve body 49. There is preferably a sufficient clearance provided in the seal cavity 49e to allow at least the secondary seal ring 49b to move freely within the seal cavity 49e. The resilient member 59c in the form of a hoop spring is arranged in the seal cavity 49e to apply a resilient force between the primary seal ring 59a and the wall of the seal cavity 49e to load the primary seal ring 59a against the wall of the seal cavity 49e in the valve body 49. Even though the resilient member 59c of the spring assembly 59 is shown as having a cylindrical shape it is to be appreciated that the resilient member 59c may have other shapes, for example, a non-cylindrical shape, for example, an obloid shape, a D-shape, or variations of a circle shape. It is also to be appreciated that the primary seal ring 59a and the secondary seal ring 59b preferably are split rings. It is also to be appreciated that the primary seal ring 59a and the secondary seal ring 59b may have other shapes corresponding to the resilient member 59c. It is also to be appreciated that the primary seal ring 59a, the secondary seal ring 59b, and the resilient member 59c of the sealing assembly 59 may have other shapes, for example, a non-cylindrical shape, for example, an obloid shape, a D-shape, or variations of a circle shape.

FIG. 4 shows an example of the intake valve 30 and the exhaust valve 130 in an internal combustion engine 78 wherein a cylinder head 43 is integrated into an engine block containing a piston 37. This concept of a single-piece head block concept has several advantages such as a decrease in the number of engine parts, for example, head bolts and/or head gaskets, and therefore, a stronger engine block and reduced manufacturing costs. A further advantage would be easy access to the modular valve mechanisms for their service and/or replacement.

Figure 5:
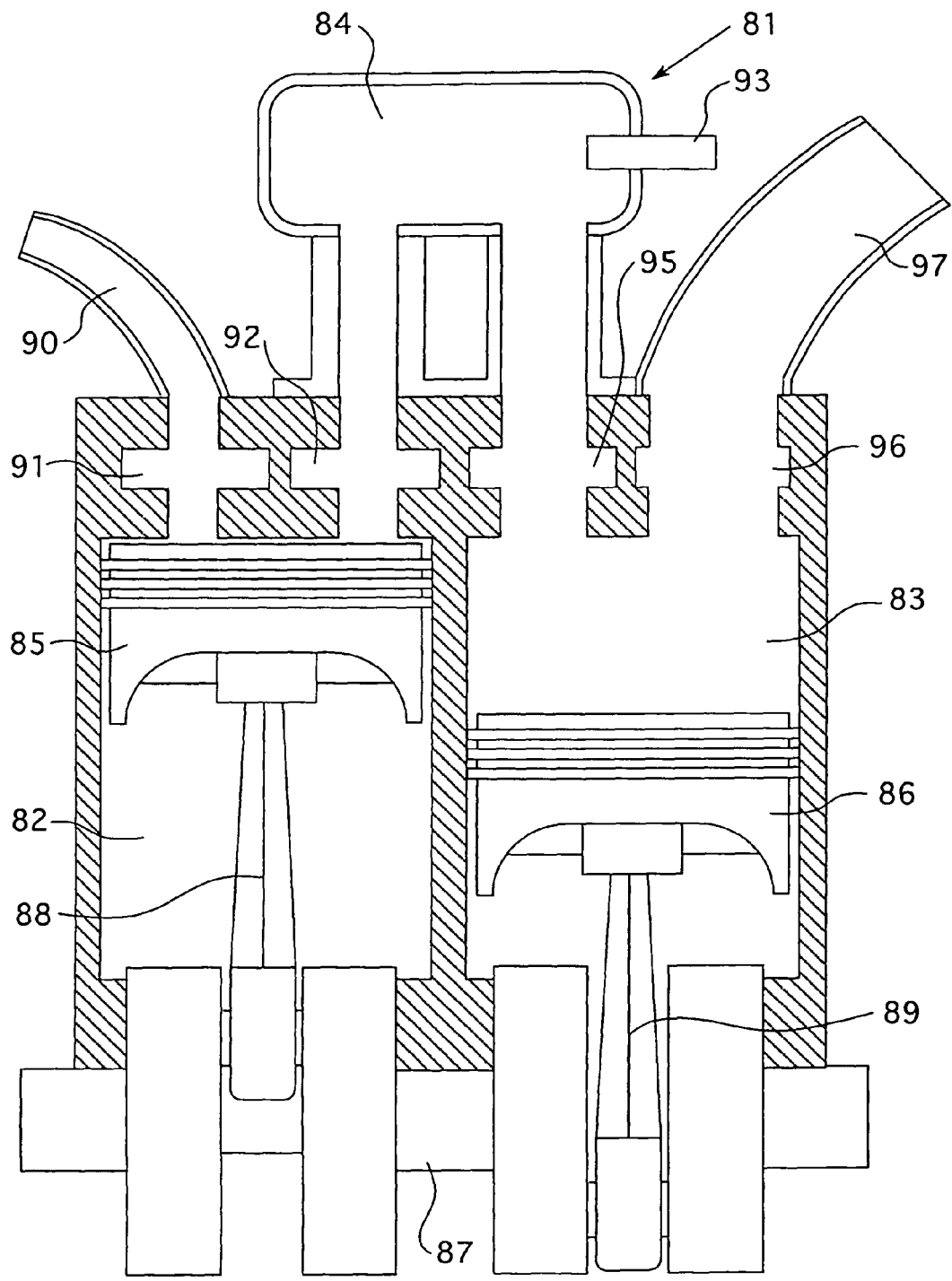
FIG. 5 is an elevational sectional view of a design for an internal combustion engine which may incorporate one or more sliding valve assemblies of the present invention.

FIG. 5 shows the sliding valve assembly of the invention as used in an internal combustion engine which may be similar to that disclosed in U.S. Patent Application Publication No. 2007/0289562 A1. In FIG. 5, engine 81 has a compression cylinder 82 and an expansion cylinder 83 which communicate with opposite ends of a combustion chamber 84, with reciprocating pistons 85, 86 in the two cylinders forming compression chambers of variable volume. The pistons 85, 86 are connected to a crankshaft 87 by connecting rods 88, 89 for movement in concert between top dead center (TDC) and bottom dead center (BDC) positions in the cylinders, with each of the pistons 85, 86 making one upstroke and one downstroke during each revolution of the crankshaft 87. Compression cylinder 82 receives fresh air through an intake conduit 90 and intake valve 91 and communicates with the inlet end of combustion chamber 84 through an outlet valve 92. Fuel is injected into the combustion chamber 84 through a fuel injector 93 or other suitable fuel inlet, where it is mixed with the air from the compression cylinder 82. The mixture burns and expands in the combustion chamber 84, and the expanding gas flows into the expansion cylinder 83 from the outlet end of the combustion chamber 84 through an inlet valve 95. Exhaust gas is discharged from the expansion cylinder 83 through an outlet valve or exhaust valve 96 and through exhaust conduit 97.

Figure 6A:
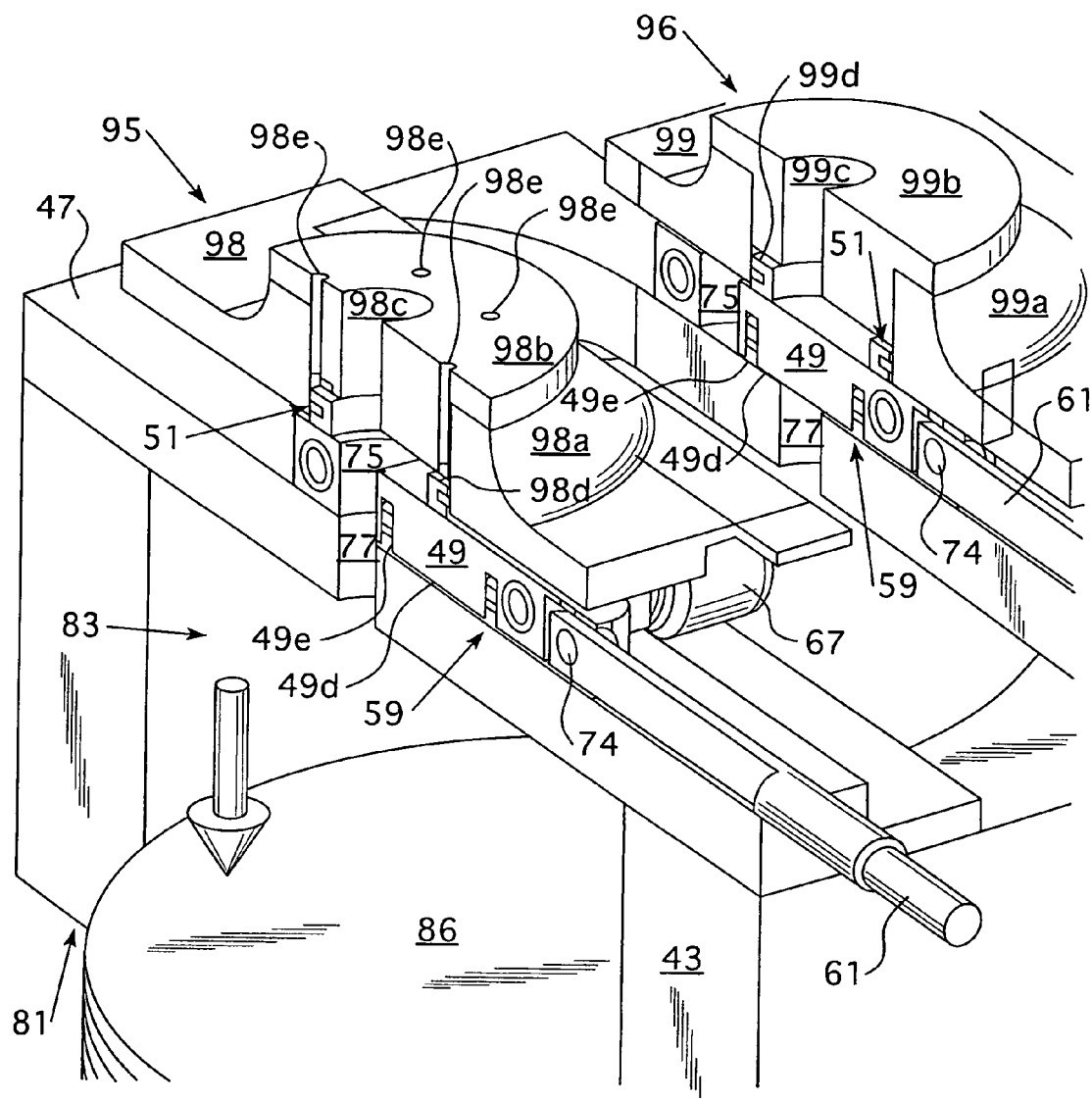
FIG. 6A is a perspective, partially cut-away view of the sliding valve assembly according to the present invention used as an intake valve and an exhaust valve during an intake stroke of the internal combustion engine of FIG. 5.
Figure 6B:
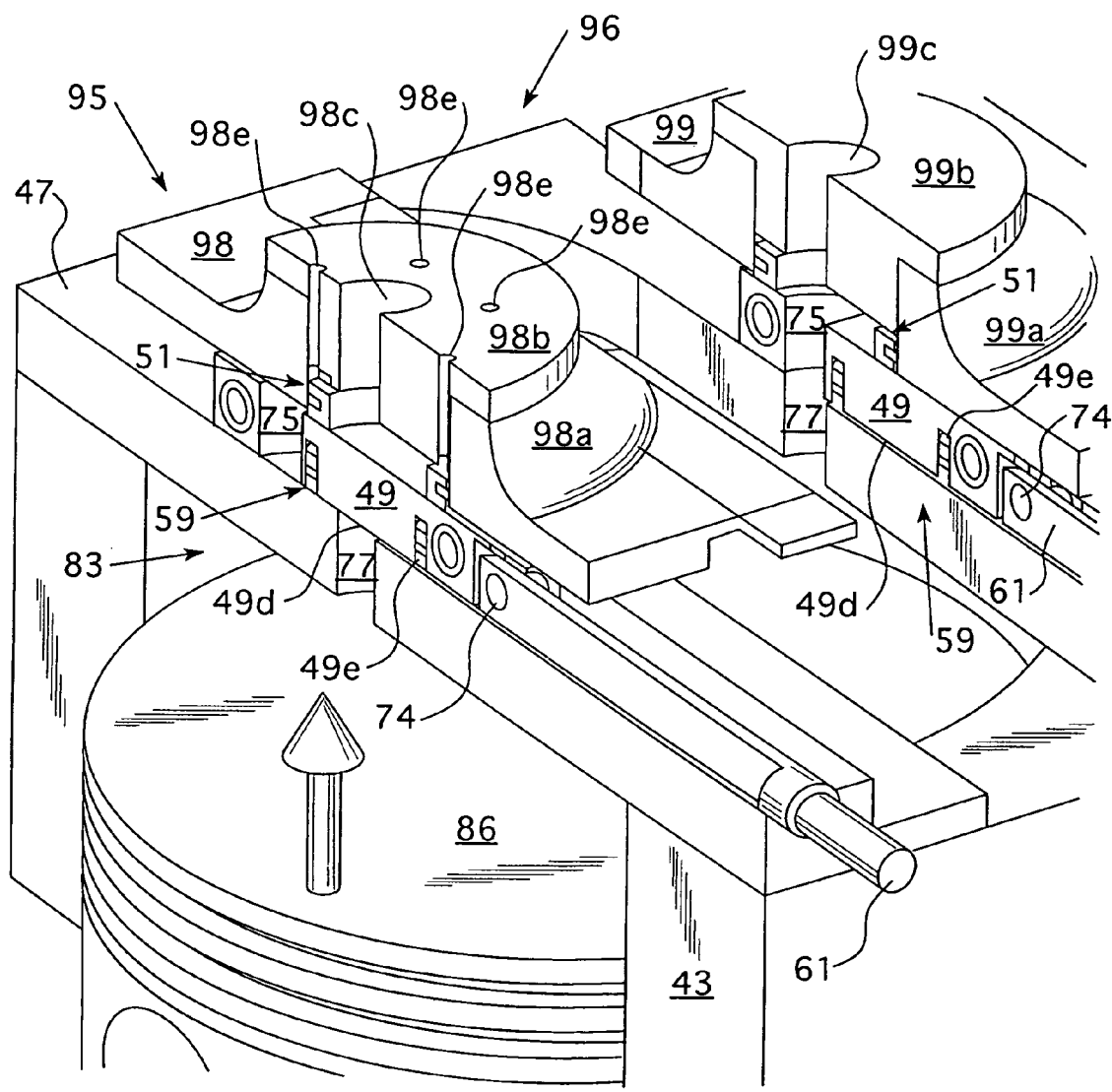
FIG. 6B is a perspective, partially cut-away view of the sliding valve assembly according to the present invention used as an intake valve and an exhaust valve during an exhaust stroke of the internal combustion engine of FIG. 5.

Intake valve 91, outlet valve 92, inlet valve 95, and exhaust valve 96 of FIG. 5, may be sliding valve assemblies of the invention similar to those discussed with reference to FIGS. 1A, 1B, 1C and 2. In this instance, the intake valve 91, the outlet valve 92, and the exhaust valve 96 preferably will have an upper valve housing 45 similar to that disclosed hereinabove with reference to FIGS. 1A, 1B, 1C and 2, wherein the cap 45b is configured as shown in these figures and the pressure within the compression cylinder 82 of FIG. 5 acts primary on the sealing assembly 51 making this sealing assembly 51 the primary seal and the sealing assembly 59 the secondary or apron seal. Referring to FIGS. 5, 6A and 6B, since the expanding gas flows from the combustion chamber 84 and into the inlet valve 95 of expansion cylinder 83, the upper valve housing 98 (FIGS. 6A and 6B) of the sliding valve assembly 95 will have a configuration such as that illustrated in FIGS. 6A and 6B wherein the expanding gas from the combustion chamber 84 of FIG. 5 acts upon the sealing assembly 51 contained within the upper valve housing 98 of the intake sliding valve assembly 95.

FIG. 6A illustrates, as indicated by the downward pointing arrow, an intake stroke for the expansion cylinder 83 and the reciprocating piston 86 of engine 81 of FIG. 5 and FIG. 6B illustrates, as indicated by the upwardly pointing arrow, an exhaust stroke for the reciprocating piston 86 and the expansion cylinder 83 of FIG. 5. In FIG. 6A the sliding valve assembly 95 is opened wherein the fluid conducting passages 98c and 77 and the fluid conducting port 75 of valve body 49 are in alignment. In FIG. 6A, the sliding valve assembly 96 is closed wherein the fluid conducting passages 99c and 77 and the fluid conducting port 75 of valve body 49 are not in alignment. FIG. 6B illustrates the exhaust stroke for the reciprocating piston 86 and the expansion cylinder 83 of FIG. 5, wherein the sliding valve assembly 95 is closed while the sliding valve assembly 96 is opened.

Referring particularly to FIGS. 6A and 6B, the intake sliding valve assembly 95 includes the upper valve housing 98 having an annular member 98a, a cap 98b mounted in the annular member 98a and having a first fluid conducting passage 98c and a seal cavity 98d for retaining a sealing assembly 51. It is to be appreciated that the upper valve housing 95 further includes cams similar to cams 63 and 65 of FIG. 2 and cam followers 67, 69, 71 and 73, wherein cam follower 67 is shown in FIG. 6A. Additionally, the sliding valve assembly 95 further includes a valve body 49 having a sealing assembly 59 and a lower valve housing 47. With regard to the sliding valve assembly 95, the upper valve housing 98, the sealing assembly 51, the valve body 49, the sealing assembly 59 in the valve body 49, and the valve housing 47 are constructed similarly to that shown in FIGS. 1A through 2. However, the difference is that cap 98b has at least six ports or channels 98e, four of which are shown in FIGS. 6A and 6B. These ports 98e extend parallel to the first fluid conducting passage 98c of cap 98b. With particular reference to FIG. 6A, the expanding gas from the combustion chamber 84 of FIG. 5 will enter ports 98e to act upon sealing assembly 51 to enhance the performance of the sealing assembly 51. In this instance, the sealing assembly 51 becomes the primary seal whereas the sealing assembly 59 in the valve body 49 becomes the secondary seal or "apron seal" in the system.

Referring particularly to FIGS. 6A and 6B, the exhaust sliding valve assembly 96 of FIG. 5 includes an upper valve housing 99 having an annular member 99a and a cap 99b mounted in the annular member 99a, a first fluid conducting passage 99c in cap 99b, a seal cavity 99d formed within the annular member 99a, and a sealing assembly 51 retained in the annular member 99a of the upper valve housing 99. Again, the exhaust sliding valve assembly 99 with its valve body 49, the sealing assembly 51, and sealing assembly 59 within the valve body 49 are constructed similarly to the sliding valve assemblies 91 and 92 of FIG. 5, which in turn, are constructed similarly to the sliding valve assemblies 30 and 130 of FIGS. 1A through 2. That is, the pressure in the expansion cylinder 83 of FIGS. 6A and 6B will act primarily on the sealing assembly 59 of the exhaust sliding valve assembly 96, thereby making the sealing assembly 59 of the exhaust sliding valve assembly 96 the primary seal and the sealing assembly 51 of the exhaust sliding valve assembly 96 the second seal or "apron seal".

Referring again to FIG. 2, valve assemblies 30, 130 also include cams 63 and 65 that have surfaces that cooperate with the surfaces of cam followers 67, 69, 71 and 73. These cooperating surfaces are responsive to the actuating rod 61 which arrangement, in effect, is designed to perform one or more functions. For example, cams 63 and 65 and cam followers 67, 69, 71 and 73 upon the oscillation of valve body 49 within the valve housing by actuating rod 61 act to: 1) constrain the valve body 49 during its translating movements within the valve housing for opening and closing the valve assembly 30, 130 and 2) release the sealing pressure of the sealing assembly 59 against the top sealing surface of the lower valve housing or plate 47 when in a closed or blocking position of valve assembly 30, 130. The cams 63 and 65 preferably include surfaces located in housings on either sides 49a and 49b of the valve body 49 with the followers 67, 69, 71 and 73 rotatably attached to the lateral sides 49a, 49b of the valve body for engagement with the cam surfaces. The cam surfaces may be straight or they may have an inclined portion. If the cam surfaces have an inclined portion, then cam followers 67, 69, 71 and 73 will raise the valve body 49 away from the valve housing during the translational movement of the valve body 49 thereby effectively separating the valve body 49 from the valve housing and thus spacing at least the sealing assembly 59 from the lower valve housing 47. The movement of the valve body 49 and the sealing assembly 59 away from the lower valve housing 47 reduces the friction which otherwise may exist between the two sealing surfaces if the sealing assembly 59 still engages the fluid impervious surface 49a of the valve body 49. The linear cams 63 and 65 and cam followers 67, 69, 71 and 73 are designed to ramp the valve body 49 with its sealing assembly 59 from the sealing surfaces and to break contact between the sealing ring assembly 59 and the sealing surface, thereby reducing friction between the two surfaces, and to break free of the frictional contact between the valve body 49 and the sealing assembly 51 and thereby allowing a more effective opening and/or closing of the sliding valve assembly of the present invention.

Referring particularly to FIGS. 1A through 1C, the sealing assemblies 51 and 59 of the sealing system of the sliding valve assemblies of the invention are configured to seal the sliding valve assembly 30, 130 in at least a radial direction. Advantageously, the sealing assemblies 51 and 59 employ relatively fewer sealing components compared to previously known sliding valve assemblies. Moreover, it is expected that the characteristics of the sealing assemblies 51 and 59 and their location within its respective sliding valve assembly are expected to further improve the sealing effect of the sliding valve assembly 30, 130.

As will be apparent to one skilled in the art, various means for actuating the actuating rod 61 to control actuation of intake valve 30 and exhaust valve 130 during operation of the engine illustrated in FIGS. 1A-1C may be employed. For example, camshafts, solenoids, rocker arms, chains, gears, belts, and hydraulic, pneumatic, electric actuators, and/or other means may be employed to cause translational movement of the valve body 49 by actuator 61.

Referring again to FIGS. 1A-1C, operation of engine 31, when used in conjunction with the sliding intake and exhaust valves 30 and 130 of the present invention, may be similar to that disclosed in U.S. Pat. No. 6,976,464 B2 issued on Dec. 20, 2005, the teachings of which are incorporated by reference herein in their entirety. In this patent, the intake and exhaust valves 20 and 120 are semi-rotating valve assemblies instead of sliding valve assemblies. While engine 31 and sliding valve assemblies 30 and 130 of the present invention as depicted FIGS. 1A-1C appear in the environment of a four stroke Otto cycle, it will be apparent to one skilled in the art that sliding valve assemblies 30 and 130 of the present invention may be employed in other engines that operate on other cycles, such as a two-stroke cycle.

FIGS. 7, 8 and 9 show a further embodiment for a valve body of a sliding valve assembly of the present invention. In this embodiment, the valve body 100 includes a front cam follower 101 and a rear cam follower 103 both of which extend substantially across the width of the valve body 100. Additionally, valve body 100 includes a fluid conducting port 105 and an actuator rod 107 for translating movement of valve body 100 within a valve housing similar to that discussed hereinabove with reference to FIGS. 1A through 2. Valve body 100 further includes a sealing assembly 109 on its lower surface 111 wherein sealing assembly 109 is constructed and functions similarly to that of sealing assembly 59 of FIGS. 1A through 2. Valve body 100 operates within the valve housing similar to that discussed herein above wherein the fluid conducting port 105 comes into and out of alignment with first fluid conducting passage and the second fluid conducting passage of the valve housing. As particularly shown in FIG. 9, the front cam follower 101 and the rear cam follower 103 cooperate with cam surfaces 112, 114 respectively, to raise and lower the valve body 100 within the valve housing and to reduce the frictional forces between the contact surfaces to enhance the life of the sealing assembly 109 and to allow the valve to effectively open and close. Cam surfaces 112, 114 may also have straight profiles.

The sealing assemblies 51, 59 and 109 of the sliding valve assembly of the invention may be considered as being a dynamic seal, that is, a pressure energized seal. An advantage of a dynamic seal is that a relatively small area is in contact with the dynamic surface, thereby producing little friction, resulting in long life of the engine and improved sealing especially at high speeds of the engine. In the absence of combustion gas pressure, the sealing assemblies 51, 59, and 109 of the invention have a continuous load from its respective resilient member or tension spring to provide a sealing line. As the system pressure increases, these sealing assemblies 51, 59 and 109 are compressed against the sealing surface by the additional pressure in the system, thereby maintaining and/or improving the effectiveness of the seal.

From the above it can further be appreciated that the sealing assembly 59 is generally in communication with a combustion chamber wherein pressure is increased in the system and this increased pressure acts on the sealing assembly 59 to increase its sealing effectiveness. However, in FIGS. 6A and 6B pressure is directed from the combustion chamber 84 and into the ports or channels 98e of the cap 98b and against the sealing assembly 51. It is apparent that the cap mounted in the upper valve housing may be removable and interchangeable depending on whether pressure is received relative to the upper valve housing or relative to the lower valve housing. That is, if the pressure in the system is available from the combustion chamber 84 of FIGS. 6A and 6B, then cap 98b with channels 98e for delivering the pressure directly against the sealing assembly 51 may be provided in the upper valve housing 98; however if the pressure in the system is available from the compression cylinder 82 of FIG. 5, then a cap without channels may be provided in the upper valve housing such as cap 45b of the upper valve housing 45 of FIGS. 1A through 1C.

As discussed herein above, it is also to be appreciated that even though the valve assembly of the invention has been disclosed relative to its being a sliding valve assembly for use in an energy conversion engine, the valve assembly of the invention may be a rotary valve assembly, a semi-rotating valve assembly, an oscillating valve assembly or any other type of valve assembly used in various applications especially pressure systems for effectively operating the sealing assembly of the present invention.

While the present invention has been described in connection with the embodiments of the various figures, it is to be understood that other similar embodiments may be used or modifications and additions may be made to the described embodiments for performing the same function of the present invention without deviating therefrom. Therefore, the present invention should not be limited to any single embodiment, but rather construed in breadth and scope in accordance with the recitation of the appended claims.

What is claimed is:

1. In an energy conversion engine, a sliding valve assembly for introducing and/or exhausting a fluid medium relative to a cylinder containing a reciprocating piston and pressure within the system, said sliding valve assembly comprising:

a valve housing mounted to the energy conversion engine and comprising a first valve housing member with a first fluid conducting passage and a second valve housing member with a second fluid conducting passage, the first valve housing member and the second valve housing member forming a valve cavity;

a valve body housed in the valve cavity of the valve housing and having a fluid conducting port adjacent to a fluid impervious surface;

an actuator connected to the valve body for translating movements of the valve body within the valve cavity of the valve housing into a fluid conducting position where the fluid conducting port of the valve body allows a fluid conducting relation between the first fluid conducting passage and the second fluid conducting passage of the valve housing and into a fluid blocking position where the fluid impervious surface of the valve body obstructs a fluid conducting relation between the first fluid conducting passage and the second fluid conducting passage of the valve housing;

wherein the valve housing and the valve body have cooperating surfaces for constraining the valve body during the translating movements of the valve body within the valve cavity of the valve housing between the fluid conducting position and the fluid blocking position of the valve body;

at least a first sealing assembly carried by the valve body and located within and across the fluid impervious surface of the valve body and adjacent to the fluid conducting port of the valve body for forming a first sealing relationship between the valve body and the valve housing wherein the valve body includes a seal cavity and wherein the first sealing assembly includes a primary seal ring, a secondary seal ring surrounding the periphery of the primary seal ring, and a resilient member arranged to apply a resilient force between the primary seal ring and a wall of the seal cavity of the valve body for loading the primary seal ring against the wall of the seal cavity of the valve body of the sliding valve assembly;

wherein the first sealing assembly has a shape selected from the group consisting of a cylindrical shape, a D-shape, an obloid shape, and variations of a circle shape; and wherein the secondary seal ring of the first sealing assembly is freely moveable relative to the seal cavity of the valve body.

2. The sliding valve assembly according to claim 1, wherein the first sealing assembly is located within a seal cavity of the valve body and forms said first sealing relationship between the valve body and the valve housing at least when the valve body is in the fluid blocking position within the valve cavity of the valve housing and when the pressure in the system is applied to the first sealing assembly.

3. The sliding valve assembly according to claim 1 further including a second sealing assembly located within the valve housing for forming a second sealing relationship between the valve housing and the valve body.

4. The sliding valve assembly according to claim 3 wherein the second sealing assembly is located within a seal cavity of the valve housing and forms said second sealing relationship between the valve body and the valve housing at least when the valve body is in the fluid blocking position within the valve cavity of the valve housing and when the pressure in the system is applied to the second sealing assembly.

5. The sliding valve assembly according to claim 3 wherein the valve housing includes a seal cavity and wherein the second sealing assembly includes a primary seal ring, a secondary seal ring surrounding the periphery of the primary seal ring, and a resilient member arranged to apply a resilient force between the primary seal ring and a wall of the seal cavity of the valve housing for loading the primary seal ring against the wall of the valve housing.

6. The sliding valve assembly according to claim 5 wherein the second sealing assembly has a shape selected from the group consisting of a cylindrical shape, a D-shape, an obloid shape, and variations of a circle shape.

7. The sliding valve assembly according to claim 5 wherein the secondary seal ring of the second sealing assembly is freely moveable relative to the seal cavity of the valve housing.

8. The sliding valve assembly according to claim 1 wherein the valve housing further includes a seal cavity and at least one channel forming a passage for passage of the system pressure against the second sealing assembly to further force the second sealing assembly within the seal cavity of the valve, housing.

9. The sliding valve assembly according to claim 1 wherein the valve housing further includes a cap defining the first fluid conducting passage and including a plurality of channels extending parallel to the first fluid conducting passage for passage of the system pressure against the second sealing assembly to further force the second sealing assembly within the seal cavity of the valve housing.

10. The sliding valve assembly according to claim 1 wherein the cooperating surfaces include cams and cam followers responsive to the actuator for releasing the sealing pressure of at least the first sealing assembly from the valve housing when the sliding valve assembly is in its blocking position.

11. The sliding valve assembly according to claim 10 wherein the cam followers are mounted to the lateral sides of the valve body and the cams are located along the lateral sides of the valve body and include cam surfaces engaged by the cams followers.

12. The sliding valve assembly according to claim 10 wherein the cam followers include a front cam follower across the width of the valve body and a rear cam follower extending across the width of the valve body, and wherein the cams include cam surfaces on the valve housing and which cam surfaces are engaged by the cam followers.

13. A valve assembly for a pressure system, comprising:
a valve housing having at least a first fluid conducting passage;
a valve body having a fluid conducting port adjacent to a fluid impervious surface;
an actuator for movements of the valve body relative to the valve housing into a fluid conducting position wherein the fluid conducting port of the valve body allows a fluid conducting relation between the first fluid conducting passage and the fluid conducting port of the valve body and into a fluid blocking position wherein the fluid impervious surface of the valve body obstructs a fluid conducting relation between the first fluid conducting passage and the fluid conducting port of the valve body;
at least a first sealing assembly carried by the valve body and located within and across the width of the fluid impervious surface and adjacent to the fluid conducting port of the valve body for forming a first sealing relationship between the valve body and the valve housing;
wherein the valve body includes a seal cavity and wherein the first sealing assembly includes a primary seal ring, a secondary seal ring surrounding the periphery of the primary seal ring, and a resilient member arranged to apply a force between the primary seal ring and a wall of the seal cavity of the valve body for loading the primary seal ring against the wall of the seal cavity of the valve body of the valve assembly;
wherein the first sealing assembly has a shape selected from the group consisting of a cylindrical shape, a D-shape, an obloid shape, and variations of a circle shape; and
wherein the secondary seal ring of the first sealing assembly is freely moveable relative to the seal cavity of the valve body.

14. The valve assembly according to claim 13 wherein the first sealing assembly is located within a seal cavity of the valve body and forms said first sealing relationship between the valve body and the valve housing at least when the valve body is in the fluid blocking position and when the pressure in the system is applied to the first sealing assembly.

15. The valve assembly according to claim 13 further including a second sealing assembly located within the valve housing for forming a second sealing relationship between the valve housing and the valve body.

16. The valve assembly according to claim 15 wherein the second sealing assembly is located in the valve housing and forms said second sealing relationship between the valve body and the valve housing at least when the valve body is in the fluid blocking position and when the pressure in the system is applied to the second sealing assembly.

17. The valve assembly according to claim 15 wherein the valve housing includes a seal cavity and wherein the second sealing assembly includes a primary seal ring, a secondary seal ring surrounding the periphery of the primary seal ring, and a resilient member arranged to apply a resilient force between the primary seal ring and a wall of the seal cavity of the valve housing for loading the primary seal ring against the wall of the valve housing.

18. The valve assembly according to claim 17 wherein the second sealing assembly has a shape selected from the group consisting of a cylindrical shape, a D-shape, an obloid shape, and variations of a circle shape.

19. The valve assembly according to claim 17 wherein the secondary seal ring of the second sealing assembly is freely moveable relative to the seal cavity of the valve housing.

20. The valve assembly according to claim 13 wherein the valve housing further includes a seal cavity and at least one channel forming a passage for passage of the system pressure against the second sealing assembly to further force the second sealing assembly within the seal cavity of the valve housing.

21. The valve assembly according to claim 13 wherein the valve housing further includes a seal cavity and a cap defining the first fluid conducting passage and including a plurality of channels extending parallel to the first fluid conducting passage for passage of the system pressure against the second sealing assembly to further force the second sealing assembly within the seal cavity of the valve housing.

22. The sliding valve assembly according to claim 1, wherein the actuator is connected to the valve body and includes a toggle mechanism for allowing free movement of the actuator relative to the valve body during the translation movements of the valve body within the valve housing; and wherein the valve housing is mounted to the energy conversion engine.

23. The valve assembly according to claim 13 wherein the actuator is connected to the valve body and includes a toggle mechanism for allowing free movement of the actuator relative to the valve body during the movements of the valve body within the valve housing; and wherein the valve housing is mounted to the pressure system.

24. A sliding valve assembly for introducing and/or exhausting a fluid medium relative to a cylinder containing a reciprocating piston for an energy conversion engine which includes pressure within the system, said sliding valve assembly comprising:

a valve housing having a first fluid conducting passage and a second fluid conducting passage separated by a valve cavity;

a valve body housed in the valve cavity of the valve housing and having a fluid conducting port adjacent to a fluid impervious surface;

an actuator for translating movements of the valve body within the valve cavity of the valve housing into a fluid conducting position where the fluid conducting port of the valve body allows a fluid conducting relation between the first fluid conducting passage and the second fluid conducting passage of the valve housing and into a fluid blocking position where the fluid impervious surface of the valve body obstructs a fluid conducting relation between the first fluid conducting passage and the second fluid conducting passage of the valve housing;

wherein the valve housing and the valve body have cooperating surfaces for constraining the valve body during the translating movements of the valve body within the valve cavity of the valve housing between the fluid conducting position and the fluid blocking position of the valve body; and at least a first sealing assembly located within the fluid impervious surface of the valve body for forming a first sealing relationship between the valve body and the valve housing; and wherein the first sealing assembly includes a primary seal ring, a secondary seal ring surrounding the periphery of the primary seal ring, and a resilient member arranged to apply a resilient force between the primary seal ring and a wall of a seal cavity of the valve body for loading the primary seal ring against the wall of the seal cavity of the valve body of the sliding valve assembly.

25. The sliding valve assembly according to claim 24 wherein the first sealing assembly has a shape selected from the group consisting of a cylindrical shape, a D-shape, an obloid shape, and variations of a circle shape.

26. The sliding valve assembly according to claim 25 wherein the first sealing assembly has a cylindrical shape.

27. The sliding valve assembly according to claim 24 wherein the secondary seal ring of the first sealing assembly is freely moveable relative to the seal cavity of the valve body.

28. A valve assembly for a pressure system, comprising:

a valve housing having at least a first fluid conducting passage;

a valve body having a fluid conducting port adjacent to a fluid impervious surface;

an actuator for movements of the valve body relative to the valve housing into a fluid conducting position wherein the fluid conducting port of the valve body allows a fluid conducting relation between the first fluid conducting passage and the fluid conducting port of the valve body and into a fluid blocking position wherein the fluid impervious surface of the valve body obstructs a fluid conducting relation between the first fluid conducting passage and the fluid conducting port of the valve body; and at least a first sealing assembly located within the fluid impervious surface of the valve body for forming a first sealing relationship between the valve body and the valve housing; and wherein the first sealing assembly includes a primary seal ring, a secondary seal ring surrounding the periphery of the primary seal ring, and a resilient member arranged to apply a force between the primary seal ring and a wall of a seal cavity of the valve body for loading the primary seal ring against the wall of the seal cavity of the valve body of the valve assembly.

29. The valve assembly according to claim 28 wherein the first sealing assembly has a shape selected from the group consisting of a cylindrical shape, a D-shape, an obloid shape, and variations of a circle shape.

30. The valve assembly according to claim 29 wherein the first sealing assembly has a cylindrical shape.

31. The valve assembly according to claim 28 wherein the secondary seal ring of the first sealing assembly is freely moveable relative to the seal cavity of the valve body.

* * * * *